Jan. 4, 1966     K. HERTEL     3,226,797
CUTTING BODY AND CHUCK CONSTRUCTION
Filed Nov. 26, 1963     4 Sheets-Sheet 1
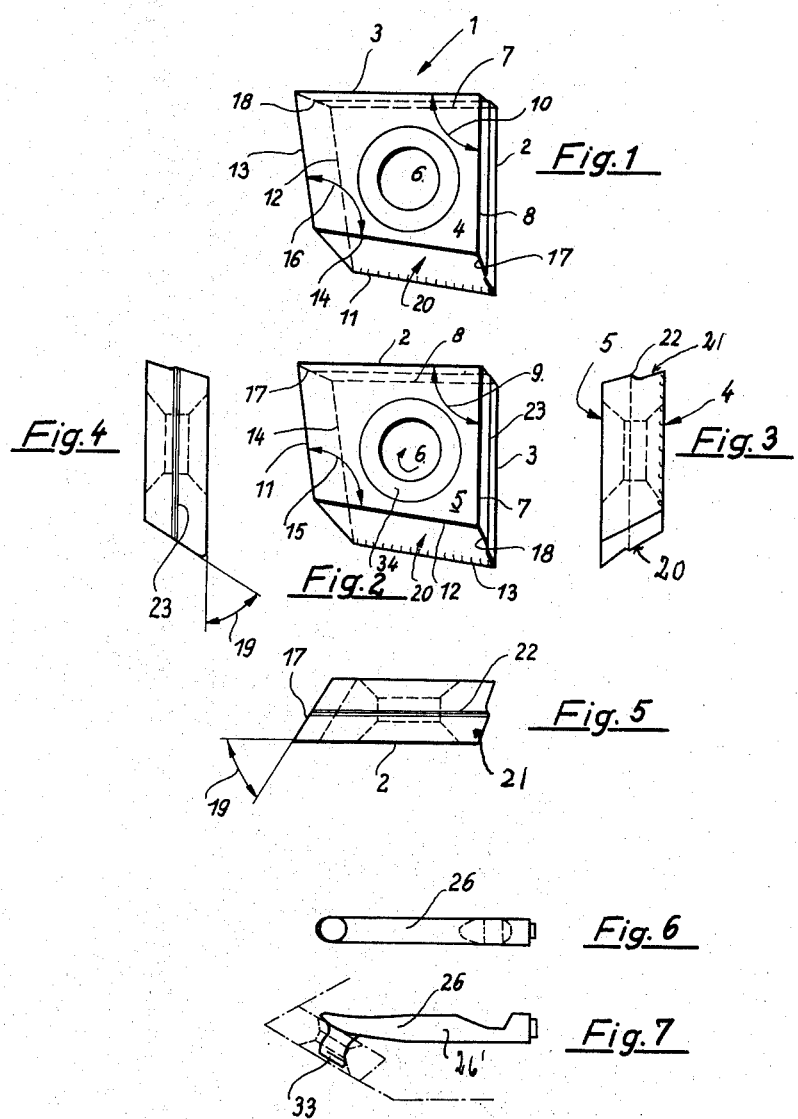
INVENTOR:
KARL HERTEL
BY: McGlew and Toren,
attorneys Jan. 4, 1966 K. HERTEL 3,226,797
CUTTING BODY AND CHUCK CONSTRUCTION
Filed Nov. 26, 1963 4 Sheets-Sheet 2
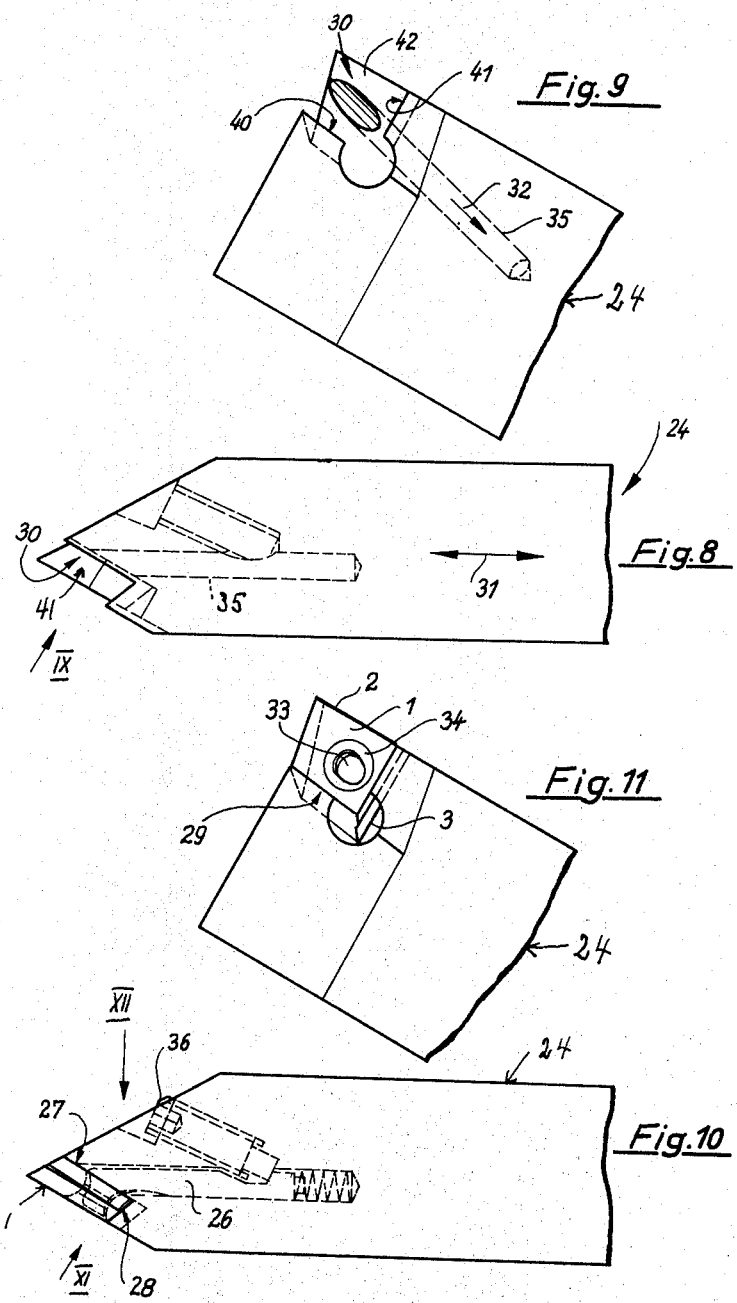
INVENTOR:
KARL HERTEL

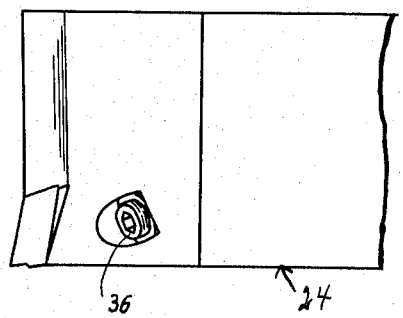
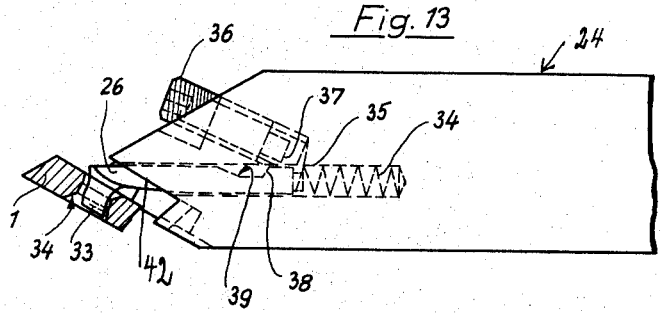

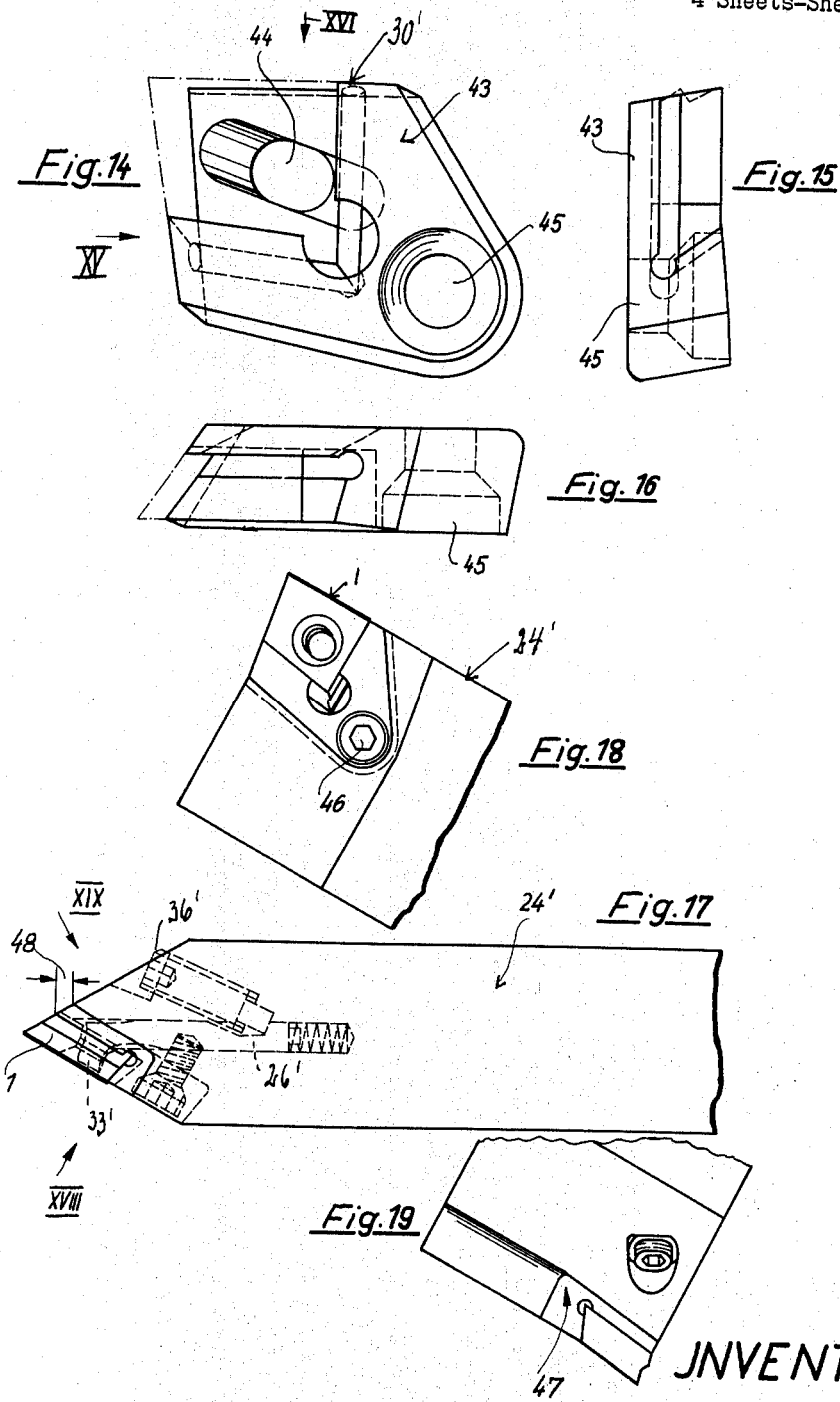

United States Patent Office

3,226,797
Patented Jan. 4, 1966

3,226,797
CUTTING BODY AND CHUCK CONSTRUCTION
Karl Hertel, Odenberger Strasse 29, Nurnberg, Germany
Filed Nov. 26, 1963, Ser. No. 326,085
Claims priority, application Germany, Mar. 12, 1963,
H 48,496
13 Claims. (Cl. 29—95)

This invention relates in general to a cutting tool construction, and in particular to a cutting body or insert of metallic or ceramic cutting material such as, for example, metallic sintered carbides or the like.

The invention relates particularly to a cutting body or insert which is particularly suitable for revolving cutting machine tools, such as lathes. The cutting body of the invention advantageously comprises a flat block or prismatic element having two substantially parallel quadrilateral cover surfaces with a bore extending through the body which extends perpendicular to the surfaces. The quadrilateral surfaces are of corresponding shape and extend in parallel planes and constitute the free surfaces of the main cutting edges of the body. Two boundary edges of the cover surfaces intersect at right angles, and one of the boundary edges is a main cutting edge.

The term "free surface" as used herein may be defined as follows: the cutting edge of a cutting tool or cutting body is formed by the common boundary edge of two adjoining surfaces of the tool. One of these surfaces is the so-called "cutting surface" which, during operation, deflects the chips cut off the workpiece. The other of these two surfaces which, relative to the direction of rotation of the workpiece, as in a lathe, is positioned behind the cutting edge, is referred to as the so-called "exposed surface" or "free surface." Thus, the aforementioned "cover" surfaces also constitute "free" surfaces as will be made apparent hereinafter.

Cutting bodies or elements of the general description set forth above are known and are generally referred to as "throw-away" plates. In these known cutting bodies several or all or border edges of the two cover surfaces which are disposed in parallel planes constitute the main cutting edges which are brought into engagement with the workpieces in succession one after the other. Tool holders which are fitted with such known cutting bodies or elements are relatively wide in the region of the cutting body point, due to the provision of a plurality of cutting edges. This is disadvantageous, because such known cutting bodies are not suitable for producing constrictions or areas of reduced cross-section, for example, necked-down portions in the workpiece. This disadvantage is particularly felt in tool holders fitted with such cutting bodies where the holders are to be used for duplicating revolving or turning workpieces. When workpieces are to be duplicated by turning, it is desired to work on those portions of the workpiece which are to be reduced in diameter by orienting the tool in a right angle manner. This is only possible where the cutting body is narrow in the entire region of the cutting point. In addition, such cutting body, in order to be suitable for cutting such reduced cross-sectional areas, should have as small a point angle as possible. Moreover, in such duplicating of workpieces by revolving or turning, it is often desired to work at the same time, that is in one working procedure, not only on the surface of the workpiece, but also on the end face of the workpiece which is mounted in the head stock of the lathe. Such simultaneous operation is not possible, however, with the known cutting bodies and the corresponding tool holders, because such operation would result in damage to the tail spindle by one of the cutting edges which, at the time of the operation, is at rest, that is, the nonoperative cutting edge which must be mounted very closely to the operating cutting edge would be caused to move into a cutting position in an undesirable manner.

A different type of cutting body is known which has relatively oblong shape in the direction of the reaction pressure. A cutting body of this nature is mounted or clamped, for example, at the area of its side flanks. While it is true that such cutting bodies can easily be provided with a small point angle, making them suitable for duplicating work, it is easily realized that in such cutting bodies it is extremely difficult to effect a satisfactory mounting or clamping of the body closely adjacent the main cutting edge. In addition, such cutting bodies which are laterally mounted are subjected to great bending stresses. These additional disadvantages are particularly critical for cutting bodies made of carbides or the like, due to the great volume of valuable and expensive material and due to their high replacement cost. They cannot be employed as so-called "throwaway" plates, but must be able to be reground after operation, and this regrinding procedure causes a high operating cost and is very costly and time consuming.

In accordance with the invention, the above difficulties are overcome by providing a cutting body with two quadrilateral cover surfaces extending in parallel planes and with two boundary edges of each cover surface intersecting at right angles, with one of the boundary edges constituting a main cutting edge. The two remaining boundary edges of each cover surface enclose an obtuse angle with each other. In addition, the two cover surfaces which are of equal configuration or shape are offset relative to each other in a mirror image-like manner about 90°. In the inventive cutting body, the length of the boundary edge which forms the main cutting edge is greater than the boundary edge which intersects the main cutting edge at a right angle. The two cutting edges of each cover surface extend at a right angle to each other, so that when the cutting body is mounted, the reserve cutting edge is always arranged to the rear within the receiving recess of the tool holding means which receive the cutting body. In this manner this reserve cutting edge is not accessible to the cut shavings. Due to the fact that the connecting edge surfaces between the two cover surfaces form an acute angle with the associated main cutting edge, the inventive cutting body is particularly suitable for duplicating or copying work. The connecting edge surfaces between the two covered surfaces extend over their entire length in the direction of the free surface of the auxiliary cutting edge and also form, in part, an auxiliary cutting edge. The inventive cutting body is particularly suitable for duplicating work because it fulfills in an optimum manner the requirement for such work, due to the very small point angle, and also because any desired lip angle or rake can be chosen. The inventive cutting tool is at the same time constructed in such a manner, and it can be arranged in a tool holder in a manner such that it is not subjected to any bending stresses and such that it resists the resulting cutting pressure with its largest material thickness, while at the same time requiring a minimum of material.

In order to render the production of the inventive cutting body less expensive, only the cover surfaces which form the free surfaces of the main cutting edges are processed so as to have cutting action, that is, for example, they are worked upon by grinding. All the other surfaces remain in sintered or similar condition in which the body is originally produced, without requiring any treatment. In this manner the costs are greatly reduced. It has also been found that, by making the surfaces in this manner so that only the main cutting edges effect the cutting action while the remaining surfaces are not finished, a longer life of the cutting body will result.

The inventive tool holder means for the cutting body is also adapted to the particular use to which the cutting body is to be put. The tool holder has, in a known manner, a mounting bolt which can be fastened in the tool holder and which penetrates the bore of the cutting body. This clamping bolt is of a construction to permit orientation of the three surfaces of the cutting body, which meet at a common point on a rigid surface, in contact engagement with corresponding surfaces of a recess in the tool holding means for support relative to the three cutting pressure components. This tool holder is made suitable for its special use particularly thereby that the clamping bolt is arranged centrally in a vertical plane which extends in the longitudinal direction of the tool holder substantially in the direction of the cutting pressure component resultant which is to be expected. The arrangement of the clamping bolt does not affect the provision of a point angle of lower magnitude at the cutting body, since the point angle merges, without increasing this amount, into the front end of the tool holder. In contrast to known prior art clamping bolts, the clamping bolt of the inventive tool holder is provided with a hook-shaped head at the end which is on the side of the cutting body. The maximum diameter of this hook-shaped head is smaller than the minimum diameter of the bore in the cutting body. Due to this measure it is possible to rotate the cutting body in order to replace a consumed cutting edge with a reserve cutting edge, or to replace one cutting body for another without entirely removing the mounting bolts. It is merely necessary to release the clamping bolts in order to take out the cutting body from the recess in the tool holder. It can be seen that because of this bolt construction the initial preparatory time for arranging the cutting body is drastically shortened, and this, of course, facilitates mass production.

Although the head of the clamping bolt abuts only at a portion of the circumference of the then outer countersink of the cutting body bore when it is in a cutting position, it is possible to draw the cutting body into the recess of the tool holder only in the direction of the clamping bolt's longitudinal extension and hence an excellent rigid mounting of the cutting body is obtained. This is so since the bearing surfaces of the recess in the tool holder which absorb the main cutting pressure, the reaction pressure and the feed pressure, include therebetween always an acute angle, and the engagement surfaces of the cutting body are complementarily or correspondingly constructed.

A further feature of the invention is the provision of a special anvil or seating plate for receiving the cutting body at the tool holder. Such a plate constitutes a special protection for tool holders in the event that the cutting body point should be broken off during operation. In such event in a tool holder without a seating plate the danger is present that the chuck itself will be damaged in the range of the recess which takes up the cutting body so that this tool holder cannot be used anymore. By interpositioning a seating plate between the cutting body and the tool holder proper, such damage is generally prevented, since any damage will be limited to the seating plate which can be easily replaced.

To permit penetration of the clamping bolt, the seating plate is provided with a bore in a similar manner to the cutting body so that it may be urged by a bolt into the position at which the surfaces absorb the cutting pressure components. The boundary surfaces of the tool holder recess for receiving the seating plate are constructed similar to the previously described recess for direct reception of the cutting body.

Accordingly, it is an object of this invention to provide an improved cutting body construction.

A further object of the invention is to provide an improved cutting body and tool holder construction.

A further object of the invention is to provide a cutting body, preferably for use in revolving machine tools, which comprises a flat block-like body having two cover surfaces of equal shape which extend in parallel planes and are quadrilateral and which cover surfaces form free surfaces of a main cutting edge and wherein the cutting body includes a bore which extends perpendicular to the cover surfaces, with two boundary edges of the cover surfaces meeting each other at a right angle and with one of the boundary edges being constructed as a main cutting edge, the remaining two boundary edges being disposed at an obtuse angle with respect to each other, and wherein the cover surfaces are of substantially equal configuration and rotated or offset relative to each other about 90° in a mirror image-like manner.

A further object of the invention is to provide an improved tool holder and cutting body with an anvil or seating plate for the cutting body adapted to position the cutting body in position for absorbing the cutting pressures.

A further object of the invention is to provide a cutting body, tool holder and seating plate for the cutting body, which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a plan view of the cutting body, illustrating one of the cover surfaces which form the free surface of a main cutting edge;

FIG. 2 is a plan view similar to FIG. 1, but indicating the opposite cover surface;

FIG. 3 is a right side elevation of the cutting body;

FIG. 4 is a left side elevation;

FIG. 5 is an end elevation;

FIG. 6 is a plan view of a clamping bolt for anchoring the cutting body in a tool holder;

FIG. 7 is a side view of the bolt indicated in FIG. 6;

FIG. 8 is a plan view of a tool holder for holding the cutting body;

FIG. 9 is a plan view taken in the direction of the arrow IX of FIG. 8;

FIG. 10 is a plan view similar to FIG. 8, but with the cutting body mounted in the tool holder;

FIG. 11 is a plan view similar to FIG. 9 with the cutting body positioned in the tool holder;

FIG. 12 is a plan view taken in the direction of the arrow XII of FIG. 10;

FIG. 13 is an elevational view similar to FIG. 10 indicating the clamping bolt in a released position;

FIG. 14 is a plan view of an anvil or seating plate for the cutting body;

FIG. 15 is a side elevation taken in the direction of the arrow XV of FIG. 14;

FIG. 16 is a view similar to FIG. 15, but on the opposite side of the seating plate;

FIG. 17 is a side elevational view of a tool holder with the inserted seating plate and mounted cutting body;

FIG. 18 is an elevation taken in the direction of the arrow XVIII of FIG. 17; and FIG. 19 is an elevation taken in the direction of the arrow XIX of FIG. 17.

Referring to the drawings in particular, the invention as embodied therein in FIGS. 1 to 5 comprises the cutting body 1 comprising a flat block or prismatic body having two cover surfaces 4 and 5 of the same configuration or shape. Each cover surface 4 and 5 has four corners and the surfaces are arranged parallel to each other and constitute the free surfaces of associated main cutting edges 2 and 3, respectively. A bore 6 extends through the cutting body substantially perpendicularly to the cover surfaces 4 and 5. The bore is countersunk at each end thereof. The cover surface 4 has boundary edges 3 and 8 which intersect or meet at right angle 10, and the cover surface 5 has border edges 2 and 7 which intersect at right angle 9. One of the boundary edges 2 or 3 is constructed as a main cutting edge. The two remaining boundary edges 11 and 12 for the cover surface 4, and 13 and 14 for the cover surface 5, define obtuse angles with respect to each other, as indicated at 15 and 16, respectively.

The representations indicated in the drawing FIGURES 1 and 2 and the reference numerals on these figures clearly show that the cover surfaces 4 and 5 are of the same shape but are offset or turned relatively to each other in a mirror image-like manner about 90°. The main cutting edges 2 and 3, which are respectively associated with the cover surfaces 4 and 5, extend in right angle relationship to each other (see FIGS. 1 and 2). The length of the cutting edges 2 and 3 is larger than the length of the boundary edges 7 and 8 which intersect these edges. The boundary edges 11 and 12 and 13 and 14, respectively, of the cover surfaces 4 and 5 are always arranged at acute angles with respect to the other two boundary edges 2 and 7 and 3 and 8 (see FIGS. 1 and 2). Connecting edges or corners 17 and 18 between the two cover surfaces 4 and 5 are arranged in respect to the associated main cutting edges 2 and 3, respectively, at an acute angle indicated at 19. These connecting edges or corners 17 and 18 extend over their entire length in the direction of the free surfaces 20 and 21, respectively, of the auxiliary cutting edges and form, in part, an auxiliary cutting edge. The angle between the free cutting edges 4, 5 and 20 and 21 of the main surfaces 2 and 3 and auxiliary cutting edges or boundary edges 17 and 18, respectively, is constant and corresponds to the associated point angle 19. The cutting surfaces are made of a single piece and are provided with cut guiding steps 22 and 23, respectively, which extend parallel to the associated main cutting edges 2 and 3. In the cutting body indicated 1 in FIGS. 1 to 5, only the cover surfaces 4 and 5 serve as free surfaces of the main cutting edges 2 and 3 and are capable of metal cutting. This means they have been worked upon by grinding or the like. All the other surfaces remain in the condition in which they were originally formed, for example by sintering in a mold.

As indicated in FIG. 8, a clamping tool 24 for holding the cutting body 1 is provided with a bore 35 for receiving a clamping bolt 26 (FIGS. 6 and 7), the bolt 26 including a shank portion 26'. The bolt 26 is adapted to be inserted in the bore 35 of the holder 24 and includes a holding portion 33 which is adapted to be inserted in the bore 6 of the cutting body 1. The clamping bolt 26 holds the cutting body 1 so that three bearing surfaces 27, 28 and 29 of the cutting body, which converge at a common point, form a secure surface-like engagement with corresponding surfaces of the holder 24 when body or insert 1 is inserted in the recess 30 of the holder. The three surfaces form a support for the cutting body in each of the cutting pressure component directions. The shank of the clamping bolt 26 extends in a vertical plane which is in the same direction as the cutting pressure resultant 32 which is to be expected. The clamping bolt 26 is provided at its cutting body end with the hook-shaped holding portion or head 33 whose maximum diameter is smaller than the minimum diameter of the bore 6 of the cutting body. The head 33, when the clamping bolt 26 is positioned, engages at a portion of the circumference of the then outer countersink 34 of the bore 6.

The mounting of the cutting body 1 in the holder 24 is accomplished as follows: First the head 33 of the clamping bolt 26 is inserted into the bore 6 of the cutting body 1 (see FIG. 13) and the cutting body is aligned or adjusted according to the boundary surfaces 40, 41 and 42 of the recess 30 (FIGS. 9 and 13). Thereafter the clamping bolt 26 is pushed into the bore 35 against the pressure of the spring 34' until a notch part 39 aligns with the end 37 of a set screw 36. The set screw 36 is then tightened to cause the end 37 to bear against the pressure surface 38 of the clamping bolt 26. As the set screw 36 is tightened, the bolt 26 is drawn into a proper position within the bore 35 and the cutting body 1 is firmly seated within the recess 30. The bearing surfaces 40, 41 and 42 of the recess 30 in the holder for receiving the cutting body 1 act as a backing to counter the main cutting pressure, the return pressure and the feed pressure, and each surface makes an acute angle with respect to the adjacent surface. In this manner corresponding surfaces 29, 28 and 27 are aligned with the surfaces 40, 41 and 42. This causes an excellent surface-like engagement of the cutting body 1 with all three bearing surfaces 40, 41 and 42 by the tension holding force produced by the clamping bolt 26, which tension force, relative to the longitudinal axis of the bore 6 of the cutting body, is strongly angled off.

FIG. 11 indicates an arrangement where the cutting body 1 is mounted so that the reserve cutting edge 3 is not accessible for cutting but is carried within the interior of the recess 30. It is also possible to orient the cutting body 1 so that the cutting edge 3 is oriented in a position corresponding to the cutting edge 2, as indicated in FIG. 11, in which instance the cutting edge 3 would be in a position for active cutting.

In FIGS. 14 to 19 there is indicated a construction wherein an anvil or seating plate 43 is provided for mounting the cutting body 1. Plate 43 comprises a substantially quadrilateral member or block which is curved along its interior surface for easy reception into a similarly outlined recess in tool holder 24'. The outer corner of the plate 43 is provided with a recess 30' similar to the recess 30 of the other embodiment, for receiving the cutting body 1. In this embodiment the cutting body 1 is held in the seating plate 43 by means of a clamping bolt 26' which includes a head portion 33' which engages in the bore 6, as in the other embodiment. In this construction the seating plate 43 forms, by means of its recess 30', bearing surfaces for receiving the cutting forces acting on the cutting member 1. The seating plate in turn, has surfaces which fit securely within a recess defined within the tool holder 24' and the seating plate is secured in position therein by means of a head screw 46 which fits into a countersunk bore 45 of the seating plate and is threaded into a suitable bore defined in the tool holder 24'. The bearing surfaces of the seating plate 43 defined by the recess 30' and the bearing surfaces of the tool holder 24' which receive the seating plate, always make an acute angle with each other. The seating plate 43 may be secured in position in the tool holder 24' first and the cutting body 1 may be attached by inserting the clamping bolt 26' into the bore 44 of the seating plate and bore 35' of the tool holder and tightening a set screw 36' as in the other embodiment.

It will be realized that in the event of complete destruction of the point of the cutting body 1 which projects beyond the seating plate 43, the latter will be damaged before damaging of the tool holder 24'. Since the cutting depth is not limitless, it will hardly be possible that the tool holder proper will be damaged in addition to the seating plate.

While specific embodiments of the invention have been shown and described in detail to illustrate the application of the inventive principles, it will be understood that the invention may be embodied otherwise without departing from such principles.

What is claimed is:

1. A cutting body made of a hard material, preferably for use in work revolving machine tools, comprising a flat block-like formed body having first and second cover surfaces of equal shape which extend in parallel planes and are quadrilateral, which cover surfaces form the free surfaces of the associated main cutting edges, said cutting body moreover havng a bore which extends substantially prependicular to said first and second cover surfaces, said first and second cover surfaces having two boundary edges which intersect at a right angle, one of these boundary edges always being constructed as a main cutting edge, the two remaining boundary edges of each of said first and second cover surfaces intersecting at an obtuse angle with each other, said cover surfaces being of substantially equal shape and offset relative to each other about 90° in mirror-image-like manner.

2. A cutting body according to claim 1, wherein the cutting edge of said first cover surface includes a main cutting edge which is disposed at substantially right angles to a cutting edge defined by said second cover surface.

3. A cutting body according to claim 1, wherein the length of the cutting edges of said first and second cover surfaces is greater than the length of the boundary edges which are adjacent to said main cutting edges.

4. A cutting body according to claim 1, including connecting edges extending between said first and second cover surfaces, each at the intersection of a main cutting edge and one of said remaining boundary edges of a respective cover surface, each of said connecting edges defining an acue angle with the main cutting edge of the respective cover surface; each of said connecting edges defining, with the respective cover surface and the two lateral surfaces of the body meeting thereat, a cutting point.

5. A cutting body according to claim 4, wherein the dihedral angles of the cutting points of said first and second cover surfaces are equal.

6. A cutting body according to claim 4, wherein only said first and second cover surfaces which serve as free surfaces for the main cutting edges and for the cutting points, are processed to have metal cutting action.

7. A cutting body according to claim 1, wherein said cutting surfaces are made of a single piece and provided with a step portion extending between each associated cutting edge and the opposite cover surface.

8. A tool holder for mounting a block-shaped cutting body having first and second cover surfaces and a bore extending through said cutting body substantially perpendicular to said cover surfaces, said cutting body having side surfaces meeting at an angle and disposed between said cover surfaces, said tool holder comprising a holder body having a block-shaped recess at one end for receiving said cutting body, with said recess having a base surface for engaging one of said cover surfaces and a pair of intersecting end surfaces for conformingly engaging an intersecting pair of said side surfaces, and a holding shaft bore defined in said holder body extending into said body from said block-shaped recess substantially parallel to said base surface, a clamping bolt in said holding shaft bore, said clamping bolt having an offset engageable portion engageable through the bore of the cutting body to angularly engage said cutting body adjacent an outer cover surface thereof, means for tightly drawing said clamping bolt into said holding shaft bore for causing firm engagement of a cover surface and two intersecting side surfaces of said cutting body with corresponding bottom and end surfaces of the recess of said holder body for absorbing the three cutting pressure components, said clamping bolt being disposed in said holder body to extend in a vertical plane and extending in the longitudinal direction of said holder body which is substantially in the direction of a pressure resultant which is expected during cutting.

9. A tool holder according to claim 8, including a seating plate, said seating plate being disposed in the holder body recess and said cutting body being held by said clamping bolt in said seating plate.

10. A tool holder according to claim 8, wherein said offset portion of said clamping bolt is provided with a head having a maximum diameter smaller than the minimum diameter of the bore of said cutting body.

11. A tool holder according to claim 10, wherein the head of said clamping bolt bears only at a portion of the circumference of the bore of said cutting body when said clamping bolt is tightened in said holder body.

12. A tool holder according to claim 10, including a seating plate having three intersecting surfaces which engage in the recess of said holder body, threaded bolt means securing said seating plate in the recess of said holder body, said cutting body being held by said securing bolt with said cover surface and two adjacent side surfaces bearing against said seating plate.

13. A tool holder body according to claim 12, wherein said holder body includes surfaces in said block-shaped recess which are disposed for bearing against similar three intersecting surfaces of said seating plate, said surfaces of said holder body and said seating plate defining an acute angle with respect to each other for counteracting the main cutting pressure, the reaction pressure and the feed pressure.

References Cited by the Examiner
UNITED STATES PATENTS 3,052,952   9/1962   Bader _____ 29—96
3,146,656   9/1964   Richards _____ 29—96

WILLIAM W. DYER, JR., *Primary Examiner.*

H. HINSON, *Examiner.*